No. 758,637. PATENTED MAY 3, 1904.
J. A. FRENZEL.
CUTTING MACHINE.
APPLICATION FILED SEPT. 10, 1903.
NO MODEL. 3 SHEETS—SHEET 1.

No. 758,637. PATENTED MAY 3, 1904.
J. A. FRENZEL.
CUTTING MACHINE.
APPLICATION FILED SEPT. 10, 1903.
NO MODEL. 3 SHEETS—SHEET 2.

Witnesses:
Geo. W. Young
N. E. Oliphant

Inventor:
John A. Frenzel
By H. G. Underwood

No. 758,637. PATENTED MAY 3, 1904.
J. A. FRENZEL.
CUTTING MACHINE.
APPLICATION FILED SEPT. 10, 1903.
NO MODEL. 3 SHEETS—SHEET 3.

Witnesses:
Geo. W. Young,
Y. E. Oliphant

Inventor
John A. Frenzel
By H. G. Underwood
Attorneys

No. 758,637.  
Patented May 3, 1904.

UNITED STATES PATENT OFFICE.

JOHN A. FRENZEL, OF WAUSAU, WISCONSIN.

CUTTING-MACHINE.

SPECIFICATION forming part of Letters Patent No. 758,637, dated May 3, 1904.

Application filed September 10, 1903. Serial No. 172,636. (No model.)

*To all whom it may concern:*

Be it known that I, JOHN A. FRENZEL, a citizen of the United States, and a resident of Wausau, in the county of Marathon and State of Wisconsin, have invented certain new and useful Improvements in Cutting-Machines; and I do hereby declare that the following is a full, clear, and exact description thereof.

My invention has for its object to provide simple economical cutting-machines, especially designed for the manufacture of smoking-tobacco from tobacco-stems and cigar-clippings, but which may be utilized for cutting straw, the organization of each machine being such that provision is had for varying the length of cut. Hence said invention consists in certain peculiarities of construction and combination of parts hereinafter particularly set forth with reference to the accompanying drawings and subsequently claimed.

Figure 1:
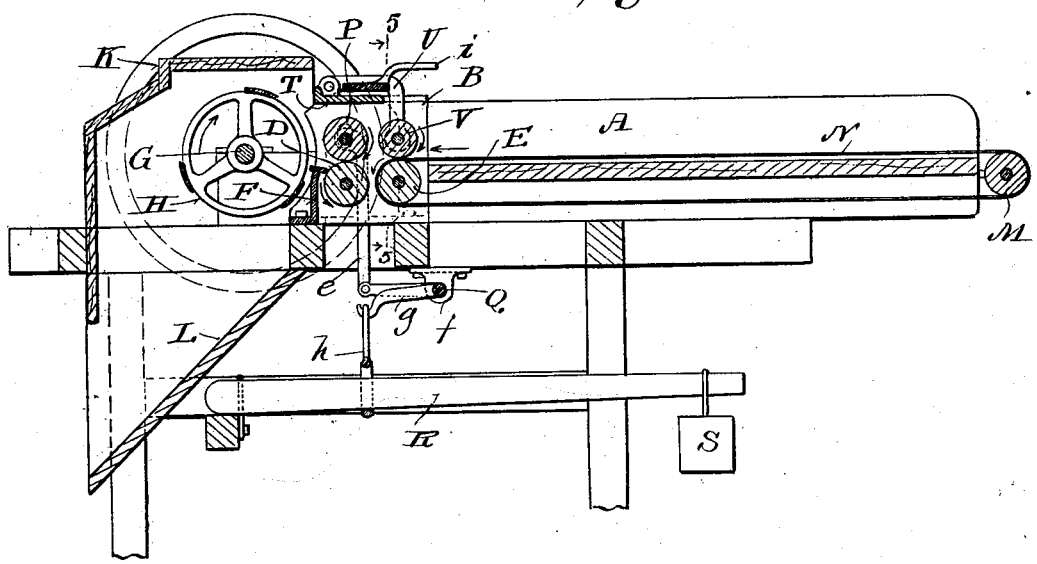
Figure 2:
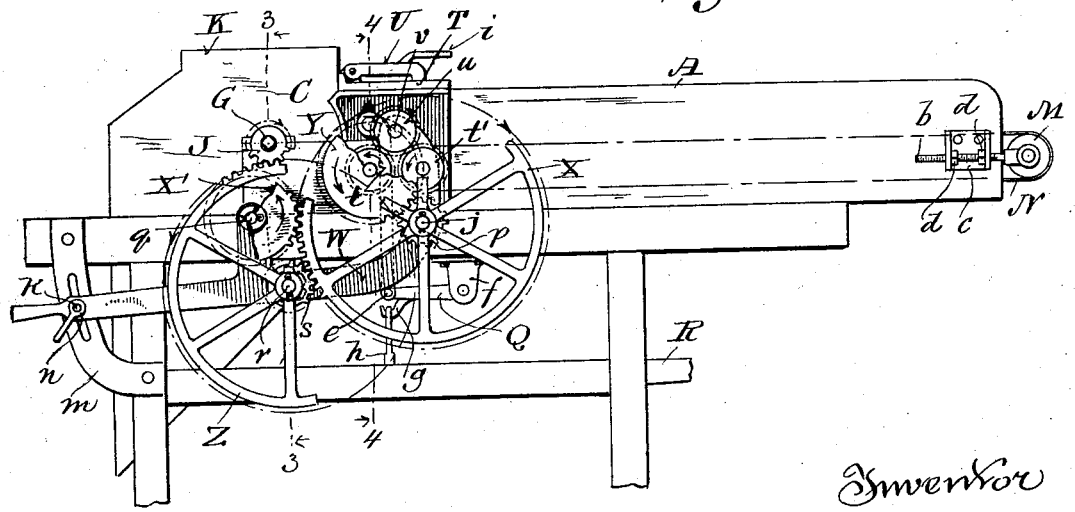
Figure 3:
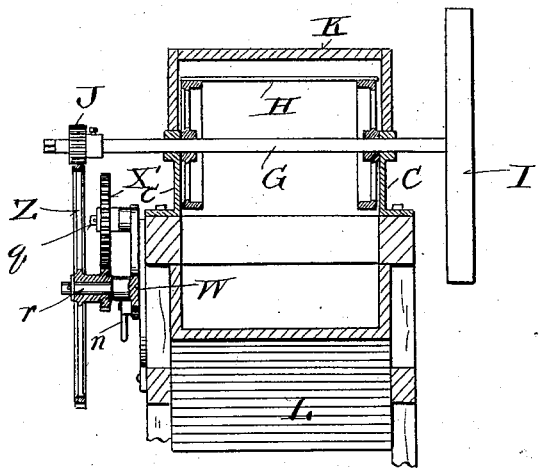
Figure 4:
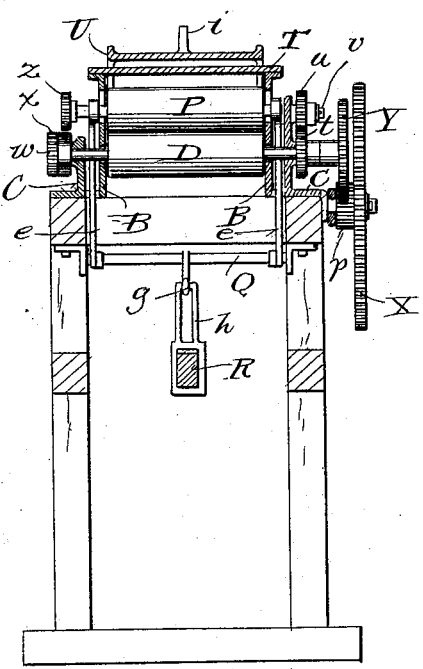
Figure 5:
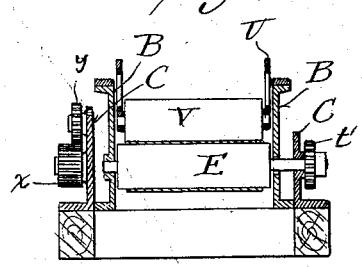
Figure 6:
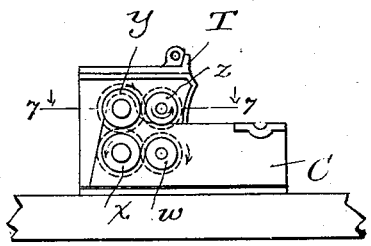
Figure 7:
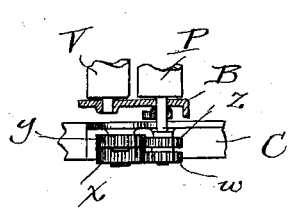
Figure 9:
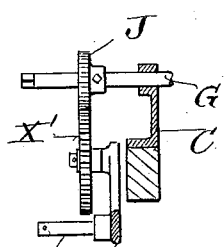
Figure 8:
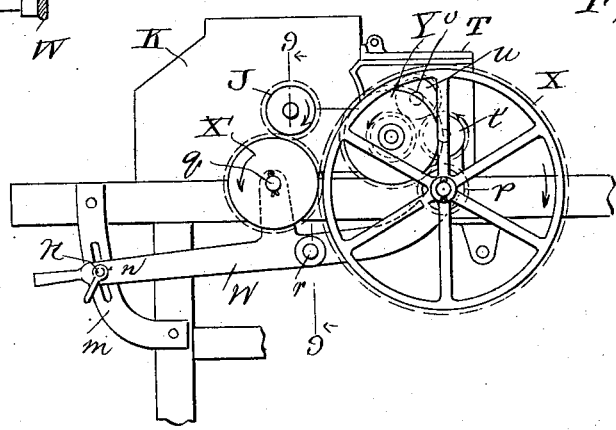

Figure 1 of the drawings represents a vertical longitudinal section view of a cutting-machine in accordance with my invention; Fig. 2, a side elevation of the same having parts thereof broken away; Figs. 3 and 4, vertical transverse sectional views of the machine, respectively indicated by lines 3 3 and 4 4 in Fig. 2; Fig. 5, a similar view indicated by line 5 5 in Fig. 1; Fig. 6, a side elevation of a fragment of the machine; Fig. 7, a plan view, partly in horizontal section, on the plane indicated by line 7 7 in Fig. 6; Fig. 8, a side elevation of another fragment of the machine, and Fig. 9 a sectional view indicated by line 9 9 in Fig. 8.

Referring by letter to the drawings, A indicates the feed-box of a cutting-machine in accordance with my invention, the same being mounted on a suitable frame, that also supports parallel plates B B, set on edge and arranged to constitute forward extensions of the sides of said box. A bracket C is mounted on the machine-frame parallel to each of the plates B, and rollers D E are journaled in the plates and brackets. The shear-plate F of the machine is mounted on the aforesaid frame adjacent to the lower feed-roller D, and the brackets C are provided with bearings for the shaft G of a knife-cylinder H, that is run by hand or power, as found most convenient in practice.

A fly-wheel I is made fast on one end of the shaft, and held in detachable connection with the other end of said shaft by a set-screw or otherwise is a spur-pinion J, it being intended that a set of such pinions, variable in the matter of size, shall accompany each machine, to be interchangeable, for the purpose of varying the length of cut, as hereinafter further explained.

A housing K is provided for the knife-cylinder, and a chute L is provided for the cut material.

Trained on the roller E and another roller M at the rear of the feed-box is an endless apron N, the stretches of which are above and below the bottom of said box. The roller M is journaled in bearings having screw-threaded shanks $b$, guided in brackets $c$, fast on sides of the feed-box, and by means of nuts $d$ the stems are adjusted to regulate tension of the apron.

The journals of an upper feed-roller P have play in vertical slots with which the plates B are provided, and these journals have their bearings in links $e$, that are connected with arms of a rock-shaft $q$, suspended in brackets $f$, depending from upper longitudinal members of the machine-frame. Suspended from a hook-arm $g$ of the rocker is a hanger $h$ for a lever R, fulcrumed on a lower transverse timber of the machine-frame, and a weight S is adjustable on the lever to regulate the pressure of the aforesaid upper feed-roller.

Pivotally hung in vertical ears of a coverpiece T on the plates B is a hanger U for a pressure-roller V, that is held down over material on the apron N parallel to the roller E when the machine is in operation, manipulation of the roller V being facilitated by means of a handle $i$, with which its hanger is provided.

Hung on a lateral stud $j$ of the machine-frame is a carrier W, provided with a bolt $k$, engaging a segmental slot in a member $m$ of the machine-frame, and a hand-nut $n$ is run on the bolt to clamp the carrier in pivotally-adjusted position. A spur-wheel X is loose on the stud $j$ outside of the pivotally-adjustable carrier, and the hub of this spur-wheel is toothed forming a spur-pinion $p$, that meshes with a spur-wheel Y, fast on a journal of the lower feed-roller. The spur-wheel X meshes with another spur-wheel X', loose on a lateral stud *q* of the carrier W, and loose on another lateral stud *r* of the carrier is a spur-wheel Z, that meshes with the pinion J when in working position. The hub of the spur-wheel Z is toothed to form a spur-pinion *s*, that meshes with the spur-wheel X aforesaid, and the spur-wheel X' is of considerably less diameter than said spur-wheel Z, both of which are adjustable with the carrier above specified.

At the power side of the machine spur-wheels *t t'*, fast on journals of the rollers D E, are in mesh with an idler spur-wheel *u*, loose on a lateral stud *v* of one of the brackets C, the motion of roller D being thus communicated to the one, E, both rollers being run at the same speed in the same direction. On the opposite side of the machine a spur-wheel *w* is fast on a journal of feed-roller D in mesh with an idler spur-wheel *x*, loose on a lateral stud of the adjacent bracket, this idler being of sufficient width of face to be also in mesh with another idler spur-wheel *y*, loose on another lateral stud of said bracket and in mesh with a spur-wheel *z*, fast on a journal of the upper feed-roller, this gearing being such that said upper feed-roller is driven at the proper speed in the proper direction when the lower feed-roller has rotation.

The machine being assembled as shown in Fig. 1, the length of cut of material fed in the path of the knives will depend on the speed of the feed apron and rollers, this speed being determined by the size of the pinion J, fast on the shaft of the knife-cylinder and in mesh with the spur-wheel Z when the latter is in working position as a result of a proper adjustment of the carrier W above specified.

By adjusting the pinion J of any size on the shaft G of the knife-cylinder and putting the spur-wheel X' in mesh therewith, as shown in Fig. 8, the length of cut will be greater than when said pinion is meshed with the spur-wheel Z aforesaid. Hence it will be understood that a pinion J of any suitable size may be used in connection with the shaft G of the knife-cylinder, and the length of cut of material fed to said knife-cylinder will be greater or less, according as said pinion is meshed with one or the other of the spur-wheels X' or Z above specified.

Having thus described my invention, what I claim as new, and desire to secure by Letters Patent, is—

A cutting-machine comprising feed-rollers and a roller-supported endless feed-apron, gearing connecting one of the feed-rollers and one of the apron-rollers, a pressure-roller having a pivotal hanger and adjustable therewith to be parallel to the geared apron-roller, spur-wheels of different diameters in connection with a pivotally-adjustable carrier, gearing connecting both spur-wheels with one of said feed-rollers, a shear-plate, a knife-cylinder, and a pinion adjustable on the shaft of said cylinder to be meshed with one or the other of said spur-wheels.

In testimony that I claim the foregoing I have hereunto set my hand, at Wausau, in the county of Marathon and State of Wisconsin, in the presence of two witnesses.

JOHN A. FRENZEL.

Witnesses:
R. P. HASKIN,
HENRY MILLER.